(12) United States Patent
Medellin et al.

(10) Patent No.: US 9,322,463 B2
(45) Date of Patent: Apr. 26, 2016

(54) HYDROKINETIC TORQUE COUPLING DEVICE WITH CENTERED LOCK-UP CLUTCH FRICTION DISC, AND METHOD FOR ASSEMBLING THE SAME

(71) Applicant: VALEO EMBRAYAGES, Amiens Cedex (FR)

(72) Inventors: Alfonso Medellin, Mision de Santiago (MX); Sungchul Lee, Troy, MI (US); Francois Baert, Troy, MI (US); Alexandre Depraete, Bloomfield, MI (US); Rabah Arhab, Saint-Brice-Sous-Foret (FR)

(73) Assignee: Valeo Embrayages (FR)

( * ) Notice: Subject to any disclaimer, the term of this patent is extended or adjusted under 35 U.S.C. 154(b) by 14 days.

(21) Appl. No.: 14/262,321

(22) Filed: Apr. 25, 2014

(65) Prior Publication Data
US 2015/0308554 A1 Oct. 29, 2015

(51) Int. Cl.
*F16H 45/02* (2006.01)
*F16H 41/24* (2006.01)
*F16F 15/12* (2006.01)

(52) U.S. Cl.
CPC ............... *F16H 45/02* (2013.01); *F16H 41/24* (2013.01); *F16F 15/12* (2013.01); *F16H 2045/0205* (2013.01); *F16H 2045/0247* (2013.01); *F16H 2045/0278* (2013.01); *F16H 2045/0294* (2013.01)

(58) Field of Classification Search
None
See application file for complete search history.

(56) References Cited

U.S. PATENT DOCUMENTS

| | | | | |
|---|---|---|---|---|
| 4,413,711 A | * | 11/1983 | Lamarche | F16F 15/12353 192/213 |
| 5,622,244 A | * | 4/1997 | Hansen | 192/3.25 |
| 5,934,426 A | * | 8/1999 | Hinkel | F16F 15/134 192/212 |
| 6,938,744 B2 | * | 9/2005 | Tomiyama | 192/3.29 |
| 8,025,136 B2 | | 9/2011 | Uhler | |
| 8,453,439 B2 | | 6/2013 | Peri | |
| 2013/0233665 A1 | * | 9/2013 | Vanni et al. | 192/3.28 |
| 2014/0216879 A1 | * | 8/2014 | Gerdeman et al. | 192/3.28 |

FOREIGN PATENT DOCUMENTS

WO    WO 99/45294 A1 * 9/1999

* cited by examiner

*Primary Examiner* — Mark Manley
(74) *Attorney, Agent, or Firm* — Berenato & White, LLC

(57) ABSTRACT

A hydrokinetic torque coupling device comprises a turbine, a driven plate non-rotatably attached to the turbine, circumferentially oriented torque transmitting elastic elements, and a friction disc including peripheral, axially extending driving tabs. The driven plate includes circumferentially oriented centering slots such that the axially extending driving tabs of the friction disc protrude into the centering slots and engage the elastic elements. A method for assembling a hydrokinetic torque converter involves providing a driven plate including circumferentially oriented centering slots, elastic elements and a friction disc including peripheral axially extending driving tabs, mounting the friction disc and the elastic elements to the driven plate so that the driving tabs of the friction disc and the driven plate engage the elastic elements, and centering the friction disc with respect to the driven plate by protruding the driving tabs into the centering slots of the driven plate.

24 Claims, 5 Drawing Sheets

HYDROKINETIC TORQUE COUPLING DEVICE WITH CENTERED LOCK-UP CLUTCH FRICTION DISC, AND METHOD FOR ASSEMBLING THE SAME

FIELD OF THE INVENTION

This invention generally relates to hydrokinetic torque coupling devices, and, more particularly, to a hydrokinetic torque coupling device including a driven plate drivingly connected through elastic drive elements to a friction plate, which is centered with respect to the driven plate through peripheral axially extending tabs.

BACKGROUND OF THE INVENTION

In the evolution of automobiles from motorized carriages to highly regulated devices for mass transportation, there has been a continuous pursuit of refinement of the basic combination of elements that comprise the automobile. One aspect of this refinement has been the transmission of torque from the engine to the drive system of the vehicle. This transmission of torque has, throughout, been accomplished by various gear or chain driven transmission systems alternatively drivingly connected to, or disconnected from, a source of motive power. The connection/disconnection feature of the drive system is accomplished by means of a clutch. Since the mid-1950's, especially in the United States, this clutch has been a fluid clutch or torque converter. Owing to the inclusion of this fluid torque transmitting coupling, enhanced refinement of the driving experience was obtained, but this refinement came at the expense of lost efficiency. To address this lost efficiency, the torque converter has become, itself, an object of greater refinement and recaptured efficiency. Often times, a modern era torque converter will include a friction clutch assembly associated with a driven member of the torque converter which, at preset loads and speeds, eliminates the fluid transmission of torque and replaces the fluid coupling with a direct mechanical friction coupling. This feature is commonly referred to as a lock-up clutch.

In the era of the lock-up clutch equipped torque converter, efficiency has been recaptured, but a loss of refinement has also occurred when the clutch is in lock-up mode and when it is transitioning into and out of lock-up mode. This is especially true when the lock-up clutch elements become worn and tolerances between various rotating and fixed elements increase/decrease in accord with their respective wear patterns. To alleviate some of the mechanical coarseness created by the incorporation of lock-up clutches onto torque converters, the clutch systems, themselves, have increased in complexity. For example, the inclusion of a driven intermediate plate, and the further inclusion of elastic damping members to keep driveline torque oscillations within acceptable parameters, adds rotational mass and complexity to the torque converter sub-assemblies. This added complexity creates the potential for a loss of refinement through vibration caused, in part, by unbalanced decentered rotation of the various components. In addition, it is common for the elastic torque transmitting member equipped devices to, over time and with use, develop rattles and other noises that create a perception of low integrity of the torque converter device. In addition, the assembly of these increasingly complex clutch and damper systems requires more time, patience, and precision. Examples of such torque converters equipped with a lock-up clutch and elastic torque transmission element through an intermediate plate are shown in U.S. Pat. Nos. 8,453,439; 8,025,136; and, 6,938,744.

BRIEF SUMMARY OF THE INVENTION

According to a first aspect of the invention, there is provided a hydrokinetic torque coupling device comprising a turbine, a driven plate non-rotatably attached to the turbine, circumferentially oriented torque transmitting elastic elements, and a friction disc including peripheral, axially extending driving tabs. The driven plate includes circumferentially oriented centering slots such that the axially extending driving tabs of the friction disc protrude into the centering slots and engage the elastic elements. The driving tabs extend into the centering slots of the driven plate so as to center the friction disc with respect to the driven plate and contain radial movement of the friction disc.

According to a second aspect of the present invention, there is provided a method for assembling a hydrokinetic torque coupling device. The method of the present invention comprises the steps of providing a turbine wheel, a driven plate including circumferentially oriented centering slots, a plurality of elastic elements and a friction disc including peripheral axially extending driving tabs; non-rotatably attaching the driven plate to the turbine wheel; mounting the friction disc and the elastic elements to the driven plate so that the driving tabs of the friction disc and the driven plate engage the elastic elements; and centering the friction disc with respect to the driven plate by protruding the driving tabs into the centering slots of the driven plate.

Other aspects of the invention, including apparatus, devices, systems, converters, processes, methods, and the like which constitute part of the invention, will become more apparent upon reading the following detailed description of the exemplary embodiments.

BRIEF DESCRIPTION OF THE SEVERAL VIEWS OF THE DRAWING(S)

The accompanying drawings are incorporated in and constitute a part of the specification. The drawings, together with the general description given above and the detailed description of the exemplary embodiments and methods given below, serve to explain the principles of the invention. In such drawings.

Figure 5A:
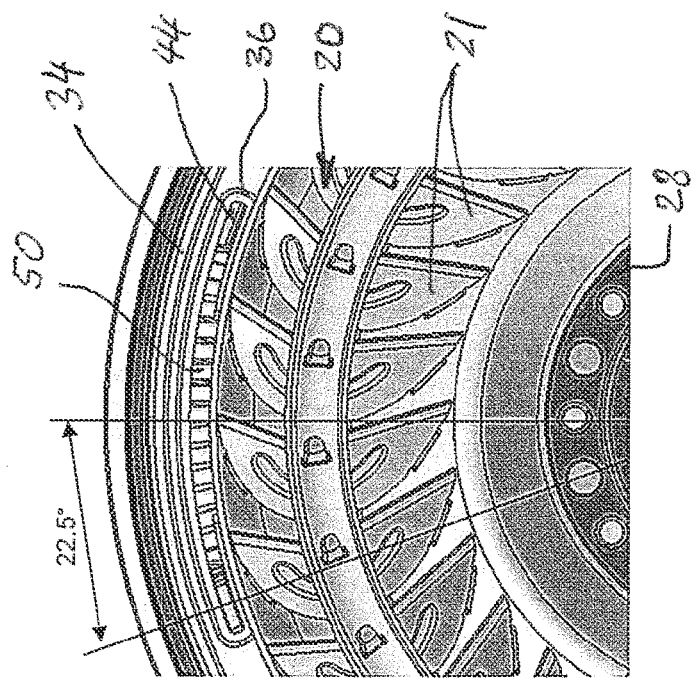
Figure 5B:
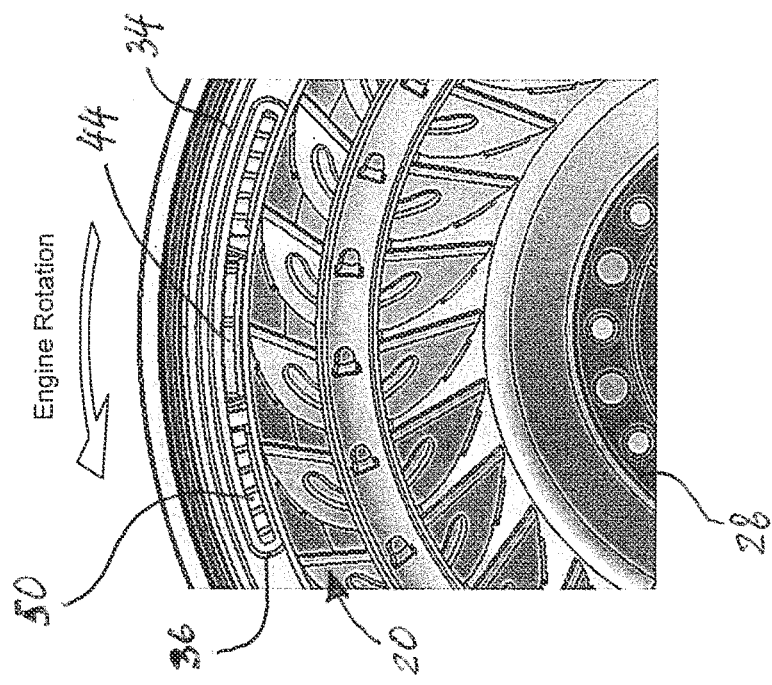

FIG. 5A is a first sequence illustration of the friction disc tab at a mid-point of travel in the coined slot in the driven plate, in which the left portion of FIG. 3A shows the degree of free rotation as approximately 22.5 degrees before edgewise contact occurs between the tab and slot; and FIG. 5B shows a position of the extended friction disc tab at a limit of its travel in the driven plate slot and the creation of the secondary torque pathway.

DETAILED DESCRIPTION OF EXEMPLARY EMBODIMENTS AND EMBODIED METHODS OF THE INVENTION

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship. Additionally, the word "a" and "an" as used in the claims means "at least one" and the word "two" as used in the claims means "at least two".

Figure 1:
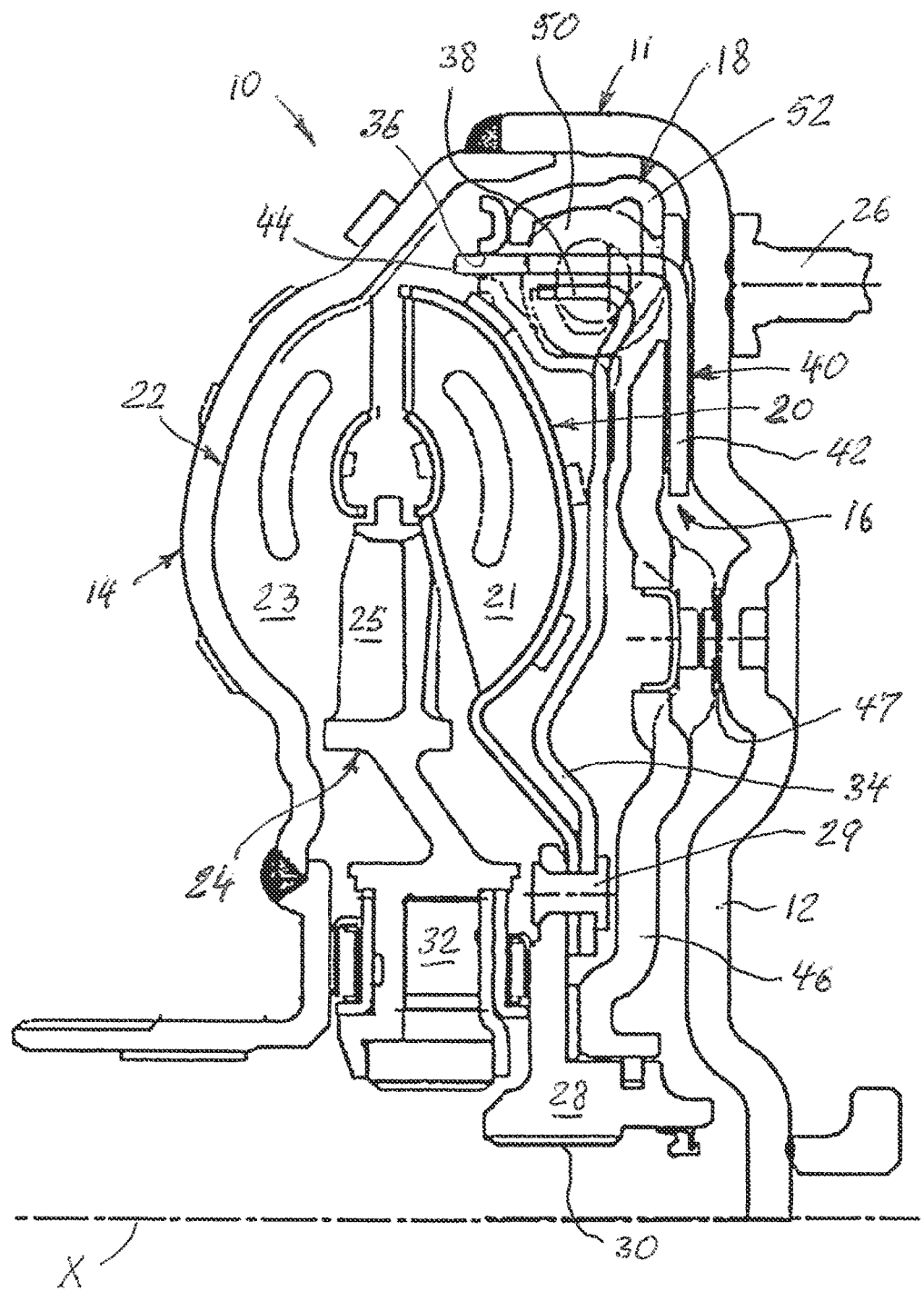
FIG. 1 is a sectional view of a hydrokinetic torque coupling device in accordance with an exemplary embodiment of the present invention.
Figure 2:
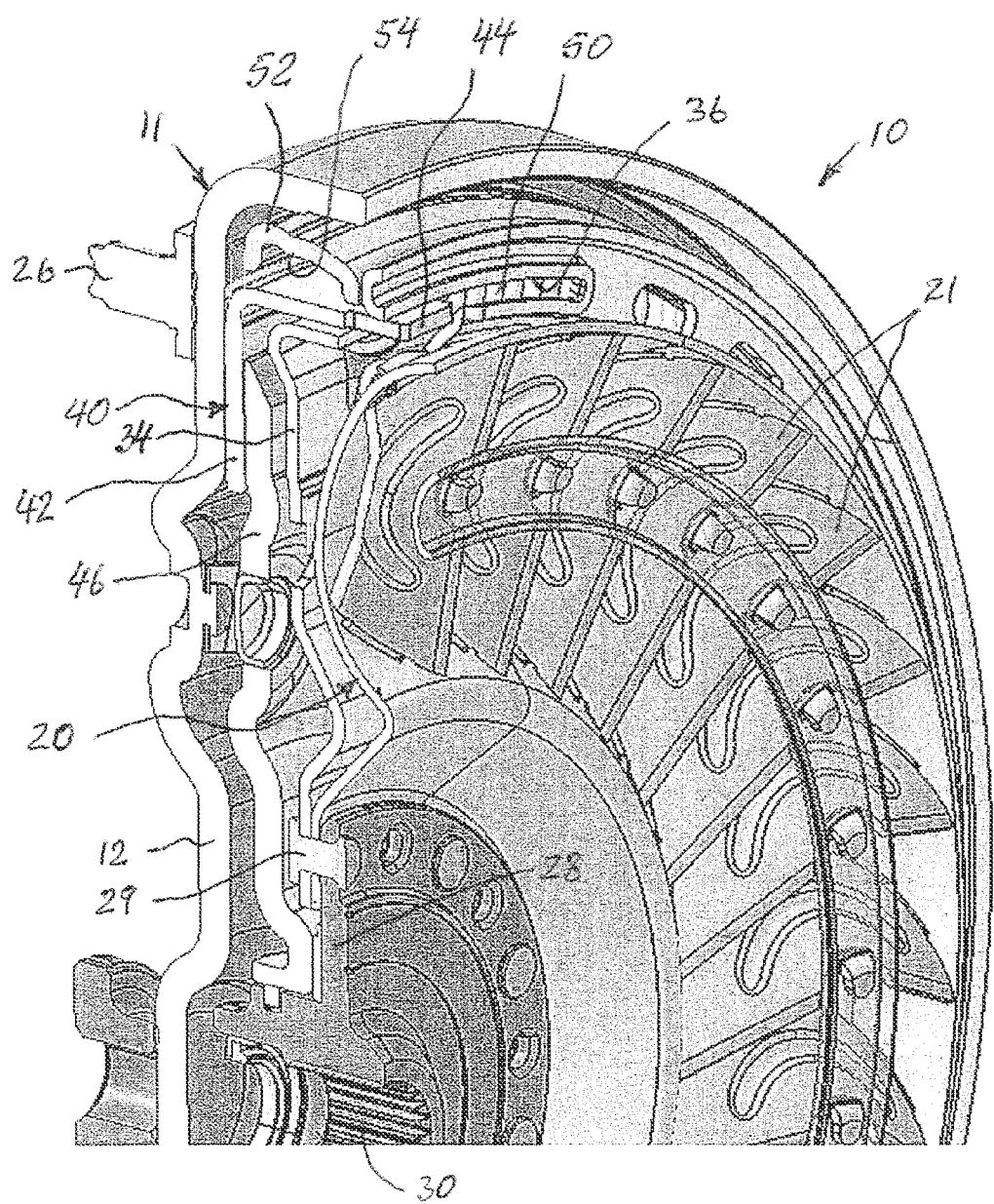
FIG. 2 is a partial sectional view, in perspective, of the hydrokinetic torque coupling device of FIG. 1.

A hydrokinetic torque coupling device is generally represented in the accompanying drawings by reference numeral 10, as best shown in FIGS. 1 and 2. The hydrokinetic torque coupling device 10 is intended to couple a driving shaft and a driven shaft, for example of a motor vehicle. In this case, the driving shaft is an output shaft of an engine, such as an internal combustion engine (not shown) of the motor vehicle and the driven shaft is connected to an automatic transmission of the motor vehicle. The hydrokinetic torque coupling device 10 comprises a sealed casing 11 filled with oil and rotatable about an axis X of rotation, a hydrokinetic torque converter 14, a lock-up clutch 16 and an elastic damping device 18. Hereinafter the axial and radial orientations are considered with respect to the axis X of the torque coupling device 10.

The hydrokinetic torque converter 14 comprises a turbine wheel 20 with vanes 21, an impeller wheel 22 with vanes 23, and a reactor (or stator) 24 with vanes 25, interposed axially between the turbine wheel 20 and the impeller wheel 22. Rivets 29 non-rotatably secure the turbine wheel 20 to a turbine hub 28. Although the rivets 29 are used in the illustrated embodiment, it should be understood that the turbine wheel 20 and the turbine hub 28 may be non-rotatably secured to one another using additional or alternative fasteners or other technique, such as, for example, welding. The turbine hub 28 is non-rotatably attached to the driven shaft (not shown) with splines 30. The turbine hub 28 is rotatable about the axis X and is coaxial with the driven shaft so as to center the turbine wheel 20 on the driven shaft. Conventionally, the vanes 21 of the turbine wheel 20 are provided to interact, in a known manner, with the vanes 23 of the impeller wheel 22. The reactor 24 is coupled in rotation to a stator shaft (not shown) through a one-way clutch 32.

The casing 11 includes two shells which are connected sealingly together at their outer periphery. One of the shells includes a casing wall 12, which extends generally transversely in a plane at right angles to the axis X, i.e., radially. The other shell of the casing 11 is so configured as to constitute the impeller wheel 22. The impeller wheel 22 is non-rotatably (i.e., fixedly) secured to the casing wall 12. In turn, the casing wall 12 is rotatably driven by the engine and is non-rotatably coupled to a crankshaft thereof with studs 26. The casing wall 12 is made integrally by press-forming in one piece, such as from sheet metal.

The torque coupling device 10 further comprises a turbine driven plate 34 operatively associated with the turbine wheel 20 and coaxial with the turbine hub 28. The rivets 29 non-rotatably secure the turbine driven plate 34 to the turbine hub 28. The turbine driven plate 34 includes one or more circumferentially oriented centering slots 36 each defining a narrow circumferential opening (or "window") through the turbine driven plate 34 in the axial direction. The turbine driven plate 34 is a stamped member of suitable metallic construction. The size of the circumferential centering slots 36 is defined based on required damper travel.

The lock-up clutch 16 of the torque coupling device 10 includes a friction disc 40 and a generally annular pressure plate 46, both axially movable to and from the casing wall 12. The pressure plate 46 is mounted to the turbine hub 28 so as to be rotatable relative thereto. The pressure plate 46 is non-rotatably coupled to the casing wall 12 by a set of elastic tongues 47, which are arranged substantially on one circumference, and which are oriented tangentially between the casing wall 12 and the pressure plate 46, while permitting relative axial displacement of the pressure plate 46.

Figure 4:
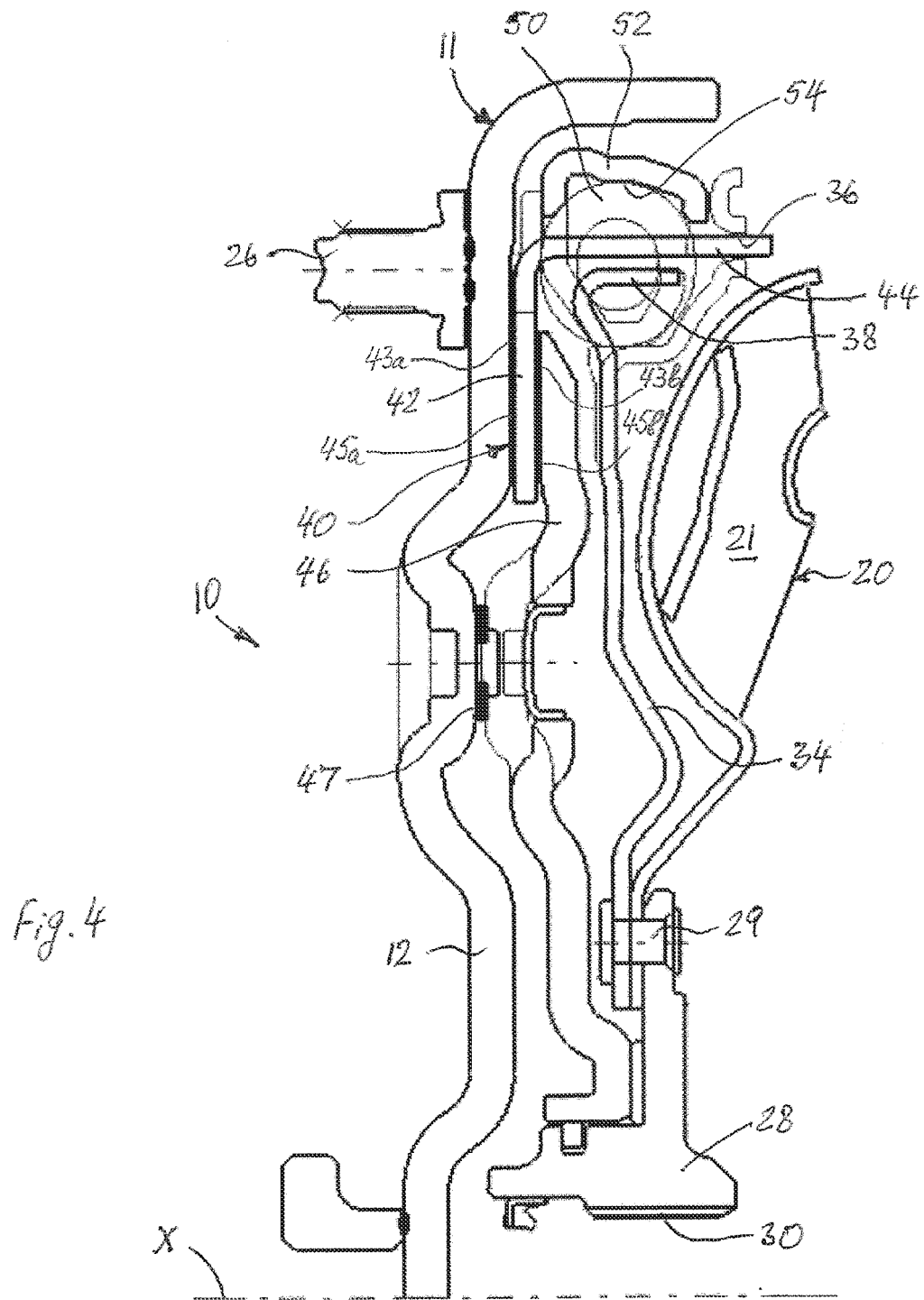
FIG. 4 is a partial sectional view of the hydrokinetic torque coupling device of FIGS. 1 and 2.

The friction disc 40 includes a generally radially extending friction portion 42 and one or more driving tabs 44 extending axially outwardly from the friction portion 42 of the friction disc 40 in the direction away from the casing wall 12. The driving tabs 44 are circumferentially equidistantly spaced from each other. The friction portion 42 is in the form of a flat annular ring. The annular friction portion 42 of the friction disc 40 has axially opposite friction faces 43a, 43b, best shown in FIG. 4. An annular friction liner 45a, 45b is attached on each of the friction faces 43a, 43b of the friction disc 40, such as by adhesive bonding, as shown in FIG. 4.

The lock-up clutch 16 is closed (or engaged) when the pressure plate 46 is displaced axially toward the casing wall 12 under the effect of hydraulic pressure so as to engage (or clamp) the friction portion 42 of the friction disc 40 between the casing wall 12 and the pressure plate 46. When the lock-up clutch 16 is closed and the friction disc 40 is engaged against the casing wall 12 by action of the pressure plate 46, the engine torque is passed from the casing wall 12 to the friction disc 40.

Thus, when under the effect of hydraulic pressure the pressure plate 46 clamps the friction disc 40 between itself and the casing wall 12 of the casing 11, the locking of the lock-up clutch 16 permits direct driving of the driven shaft by the splines 30 on the turbine hub 28 from the casing 11, non-rotatably connected to the crankshaft of the engine of the vehicle, through the elastic damping device 18 without jolts, and vibrations from the engine are filtered.

The driving tabs 44 of the friction disc 40 extend axially into and through the centering slots 36 in the turbine driven plate 34 so as to engage circumferentially oriented torque transmitting elastic elements 50, such as coil springs (damper springs), of the elastic damping device 18. Specifically, each of the driving tabs 44 engages two damper springs 50 on circumferentially opposite sides of each of the driving tabs 44. In other words, each of the driving tabs 44 extends through and engages two adjacently disposed, spaced coil springs 50. By extending the driving tabs 44 axially through the centering slots 36 in the turbine driven plate 34, the friction disc 40 is centered with respect to the turbine driven plate 34 and the turbine hub 28 through extended peripheral driving tabs 44 on the friction disc 40. Thus, the driving tabs 44 extended axially through the centering slots 36 in the turbine driven plate 34 cause the friction disc 40 to be centered with respect to the turbine driven plate 34.

The turbine driven plate 34 further includes one or more abutment elements 38, which are integrally press-formed on the turbine driven plate 34 so as to be angularly equidistantly spaced from each other. The abutment elements 38 have abutment surfaces on circumferential ends of the mutually facing abutment elements 38.

Figure 3:
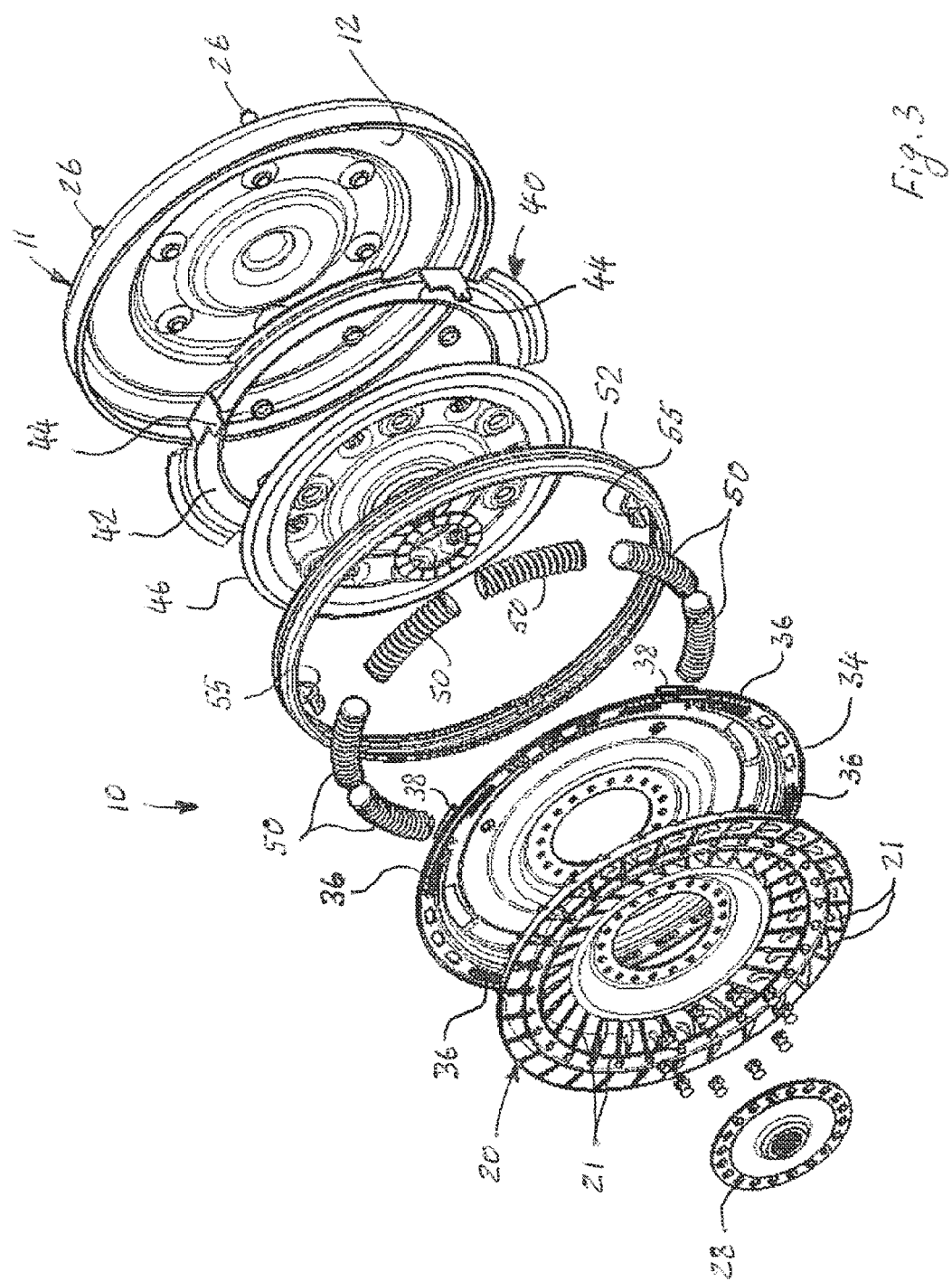
FIG. 3 is a partial exploded view of the hydrokinetic torque coupling device of FIGS. 1 and 2.

The torque coupling device 10 further comprises a generally annular intermediate member 52 defining a substantially annular groove (or channel) 54 directed radially inwardly around its circumference. The intermediate member 52 is preferably a stamped member of suitable metallic construction. The groove 54 of the intermediate member 52 partially houses the coil springs 50, which are distributed over the circumference of the groove 54, so as to support the coil springs 50 against the centrifugal force. Moreover, as best shown in FIG. 3, the intermediate member 52 includes one or more abutment elements 55 (shown in FIG. 3), which are integrally press-formed on the intermediate member 52 so as to be angularly equidistantly spaced from each other. The abutment elements 55 have abutment surfaces on circumferential ends of the mutually facing abutment elements 55.

Accordingly, the elastic torque transmitting elements 50 are held in the interface between the driving tabs 44 of the friction disc 40, the abutment elements 55 of the intermediate member 52 and the abutment elements 38 of the turbine driven plate 34 so as to transmit damped rotational torque from the friction disc 40 to the turbine driven plate 34 through the coil springs 50 and the intermediate member 52. In other words, the intermediate member 52 is drivingly connected to the driven plate 34 through the elastic drive elements 50. In turn, the friction disc 40 is drivingly connected to the intermediate member 52 through the elastic drive elements 50. Thus, the elastic drive elements 50 are disposed and are compressible between the driving tabs 44 of the friction disc 40 and the abutment elements 55 of the intermediate member 52, and between the abutment elements 55 of the intermediate member 52 and the abutment elements 38 of the turbine driven plate 34.

When the friction disc 40 is engaged (or locked) against the casing wall 12 by action of the pressure plate 46, the suitably damped engine torque is passed through the driving tabs 44 of the friction disc 40 to the abutment elements 38 of the turbine driven plate 34 and the abutment elements 55 of the intermediate member 52 via the elastic members 50. However, when the engine torque exceeds the capacity of the elastic members 50, the driving tabs 44 of the friction disc 40 come into edgewise contact with the lateral extent of the centering slots 36 in the turbine driven plate 34 and stop the further collapsing of the elastic members 50. Hence, where the elastic members 50 are the primary torque path in low and mid-range torque transmission, the driving tabs 44 of the friction disc 40 can also pass torque directly to the driven plate 34 when the torque limits of the elastic members 50 are exceeded.

The insertion of the driving tabs 44 of the friction disc 40 into the centering slots 36 in the driven plate 34 centers the friction disc 40 with respect to the turbine driven plate 34 and the turbine hub 28.

A further reason for insertion of the driving tabs 44 of the friction disc 40 into the centering slots 36 in the driven plate 34 is to contain radial movement of the friction disc 40 as it wears. The friction disc 40 will tend to increasingly move axially and radially with use and wear; the engagement into the centering slots 36 contains the radial movement and allows for tighter radial tolerances between the associated driven plate 34, friction disc 40, and intermediate member 52. Thus, the driving tabs 44 of the friction disc 40 are also radially constrained in the centering slots 36 in the driven plate 34 adjacent to the intermediate plate 52. As a result, fewer rattles and other vibration sourced noises are created.

Insertion of the driving tabs 44 of the friction disc 40 into the centering slots 36 in the driven plate 34 provides the additional torque capacity due to edgewise driving contact between the driving tabs 44 of the friction disc 40 and the edge of the centering slots 36 when the elastic member 50 has collapsed in use. Lighter damper springs 50 may be chosen that may be more useful at damping most anticipated torque but, when such lower or lighter duty limits are exceeded, the considerably increased relative strength of the driving tabs 44 of the stamped friction disc 40 interacting with the similarly stamped centering slots 36 in the driven plate 34 provide a very high over capacity for torque transmission as compared to the damper springs 50 alone.

FIGS. 5A and 5B show the relative rotational movement of the driving tabs 44 on the friction disc 40 and the centering slots 36 on the driven plate 34. FIG. 5A shows the driving tabs 44 of the friction disc 40 at a relative midpoint within the centering slot 36. In this instance, transmitted torque is well within the limits of the included damper springs 50. In FIG. 5B, the damper movement has exceeded the pre-defined arbitrary limit of 22.5°, and the driving tabs 44 of the friction disc 40 have come into edgewise contact with the centering slots 36. Torque is then passed directly from the friction disc 40 to the driven plate 34 in this over capacity circumstance. In the exemplary embodiment shown, the relative movement between the friction disc 40 and the driven plate 34 is the full stroke of damper travel, the relative motion of the friction disc 40 and the intermediate member 52 is ½ the damper stroke travel. These determinations of relative movement and edgewise stopper effect can be changed according to design requirements, torque transmission parameters, the strength and length of the elastic member 50, and a length of the centering slot 36.

Described below is an exemplary method whereby the hydrokinetic torque coupling device 10 according to the exemplary embodiment of the present invention is assembled. It should be understood that alternative methods may be practiced within the scope of the invention.

According to an embodied method, the turbine wheel 20, the turbine hub 28, the driven plate 34 including the circumferentially oriented centering slots 36, a plurality of the elastic elements 50, the intermediate member 52 and the friction disc 40 including the peripheral axially extending driving tabs 44 are provided. Then, the turbine wheel 20 and the driven plate 34 are non-rotatably attached to the turbine hub 28 by any appropriate means, such as by rivets 29. Next, the friction disc 40, the intermediate member 52 and the elastic elements 50 are mounted to the driven plate 34 so that the elastic drive elements 50 are disposed between the driving tabs 44 of the friction disc 40 and the abutment elements 55 of the intermediate member 52, and between the abutment elements 55 of the intermediate member 52 and the abutment elements 38 of the turbine driven plate 34. The friction disc 40 is centered with respect to the driven plate 34 by protruding the driving tabs 44 of the friction disc 40 into the centering slots 36 of the driven plate 34.

The foregoing description of the exemplary embodiment(s) of the present invention has been presented for the purpose of illustration in accordance with the provisions of the Patent Statutes. It is not intended to be exhaustive or to limit the invention to the precise forms disclosed. The embodiments disclosed hereinabove were chosen in order to best illustrate the principles of the present invention and its practical application to thereby enable those of ordinary skill in the art to best utilize the invention in various embodiments and with various modifications as suited to the particular use contemplated, as long as the principles described herein are followed. This application is therefore intended to cover any variations, uses, or adaptations of the invention using its general principles. Further, this application is intended to cover such departures from the present disclosure as come within known or customary practice in the art to which this invention pertains. Thus, changes can be made in the above-described invention without departing from the intent and scope thereof. It is also intended that the scope of the present invention be defined by the claims appended thereto.

What is claimed is:

1. A hydrokinetic torque coupling device comprising:
   a driven plate including circumferentially oriented centering slots;
   circumferentially oriented torque transmitting elastic elements; and
   a friction disc including peripheral driving tabs extending axially to protrude into said centering slots of said driven plate and engage said elastic elements;
   said driving tabs protruding into said centering slots of said driven plate to center said friction disc with respect to said driven plate.

2. The hydrokinetic torque coupling device as defined in claim 1, wherein said elastic elements drivingly connect said friction disc to said driven plate.

3. A hydrokinetic torque coupling device comprising:
   a driven plate including circumferentially oriented centering slots;
   circumferentially oriented torque transmitting elastic elements;
   a friction disc including peripheral driving tabs extending axially to protrude into said centering slots of said driven plate and engage said elastic elements; and
   an intermediate member defining a substantially annular groove directed radially inwardly, said intermediate member partially housing and radially supporting said elastic elements;
   said elastic elements drivingly connect said friction disc to said driven plate;
   said driving tabs protruding into said centering slots of said driven plate to center said friction disc with respect to said driven plate.

4. The hydrokinetic torque coupling device as defined in claim 3, wherein said elastic elements drivingly connect said intermediate member to said driven plate; and wherein said elastic elements and said intermediate member drivingly connect said friction disc to said driven plate.

5. The hydrokinetic torque coupling device as defined in claim 4, wherein each of said driven plate and said intermediate member includes abutment elements such that said elastic elements are disposed and are compressible between said driving tabs of said friction disc and said abutment elements of said intermediate member, and between said abutment elements of said intermediate member and said abutment elements of said driven plate.

6. The hydrokinetic torque coupling device as defined in claim 4, wherein said driven plate, said friction disc and said intermediate member comprise stamped metallic construction.

7. The hydrokinetic torque coupling device as defined in claim 4, wherein relative rotational motion between said friction disc and said intermediate member is half the motion between said friction disc and said driven plate.

8. The hydrokinetic torque coupling device as defined in claim 1, wherein, wherein said elastic elements comprise coil springs.

9. The hydrokinetic torque coupling device as defined in claim 1, wherein said driving tabs of said friction disc drive said driven plate through edgewise contact with said centering slots when engine torque exceeds the capacity of said elastic elements.

10. The hydrokinetic torque coupling device as defined in claim 1, further comprising a turbine wheel non-rotatably and operatively connected to said driven plate.

11. The hydrokinetic torque coupling device as defined in claim 1, further comprising a turbine hub non-rotatably secured to said turbine wheel and said driven plate.

12. A hydrokinetic torque coupling device comprising:
    a turbine wheel;
    a driven plate non-rotatably and operatively connected to said turbine wheel, said driven plate including circumferentially oriented centering slots;
    circumferentially oriented torque transmitting elastic elements;
    a friction disc including peripheral driving tabs extending axially to protrude into said centering slots of said driven plate and engage said elastic elements;
    an intermediate member defining a substantially annular groove directed radially inwardly; and
    a turbine hub non-rotatably secured to said turbine wheel and said driven plate;
    said intermediate member partially houses and radially supports said elastic elements;
    said driving tabs protruding into said centering slots of said driven plate to center said friction disc with respect to said driven plate;
    said elastic elements drivingly connecting said intermediate member to said driven plate;
    said elastic elements and said intermediate member drivingly connecting said friction disc to said driven plate;
    each of said driven plate and said intermediate member including abutment elements such that said elastic elements are disposed and are compressible between said driving tabs of said friction disc and said abutment elements of said intermediate member, and between said abutment elements of said intermediate member and said abutment elements of said driven plate.

13. A method for assembling a hydrokinetic torque coupling device, said method comprising the steps of:
    providing a driven plate including circumferentially oriented centering slots, a plurality of elastic elements and a friction disc including peripheral axially extending driving tabs;
    mounting said friction disc and said elastic elements to said driven plate so that said driving tabs of said friction disc and said driven plate engage said elastic elements; and
    centering said friction disc with respect to said driven plate by protruding said driving tabs into said centering slots of said driven plate.

14. The method as defined in claim 13, wherein said friction disc is mounted to said driven plate so as to be drivingly connected to said driven plate through said elastic elements.

15. The method as defined in claim 14, wherein said hydrokinetic torque coupling device further comprises an intermediate member defining a substantially annular groove directed radially inwardly; wherein said intermediate member partially houses said elastic elements so as to radially support said elastic elements.

16. The method as defined in claim 15, wherein said method further comprising the step of mounting said intermediate member to said driven plate so that said intermediate member is drivingly connected to said driven plate through said elastic elements so that said friction disc is drivingly connected to said driven plate through said elastic elements and said intermediate member.

17. The method as defined in claim 16, wherein each of said driven plate and said intermediate member includes abutment elements such that said elastic elements are disposed and are compressible between said driving tabs of said friction disc and said abutment elements of said intermediate member, and between said abutment elements of said intermediate member and said abutment elements of said driven plate.

18. The method as defined in claim 16, wherein said driven plate, said friction disc and said intermediate member comprise stamped metallic construction.

19. The method as defined in claim 16, wherein relative rotational motion between said friction disc and said intermediate member is half the motion between said friction disc and said driven plate.

20. The method as defined in claim 13, wherein, wherein said elastic elements comprise coil springs.

21. The method as defined in claim 13, wherein said driving tabs of said friction disc drive said driven plate through edgewise contact with said centering slots when engine torque exceeds the capacity of said elastic elements.

22. The method as defined in claim 13, further comprising the steps of providing a turbine wheel and non-rotatably attaching said driven plate to said turbine wheel.

23. The method as defined in claim 22, further comprising the step of providing a turbine hub and non-rotatably securing said turbine hub to said turbine wheel and said driven plate.

24. A method for assembling a hydrokinetic torque coupling device, said method comprising the steps of:
providing a driven plate including circumferentially oriented centering slots, a plurality of elastic elements, a friction disc including peripheral axially extending driving tabs and an intermediate member defining a substantially annular groove directed radially inwardly, said intermediate member partially housing said elastic elements so as to radially support said elastic elements, each of said driven plate and said intermediate member including abutment elements such that said elastic elements are disposed and are compressible between said driving tabs of said friction disc and said abutment elements of said intermediate member, and between said abutment elements of said intermediate member and said abutment elements of said driven plate;
mounting said friction disc and said elastic elements to said driven plate so that said driving tabs of said friction disc and said driven plate engage said elastic elements;
centering said friction disc with respect to said driven plate by protruding said driving tabs into said centering slots of said driven plate;
mounting said intermediate member to said driven plate so that said intermediate member is drivingly connected to said driven plate through said elastic elements so that said friction disc is drivingly connected to said driven plate through said elastic elements and said intermediate member;
providing a turbine wheel and a turbine hub;
non-rotatably attaching said driven plate to said turbine wheel; and
non-rotatably securing said turbine hub to said turbine wheel and said driven plate.

* * * * *